(12) United States Patent
Burnier

(10) Patent No.: US 11,692,331 B2
(45) Date of Patent: Jul. 4, 2023

(54) WORK VEHICLE WITH IMPROVED CONTROL VALVES CONTROLLERS

(71) Applicant: KUBOTA CORPORATION, Osaka (JP)

(72) Inventor: Jean-Louis Burnier, Argenteuil (FR)

(*) Notice: Subject to any disclaimer, the term of this patent is extended or adjusted under 35 U.S.C. 154(b) by 340 days.

(21) Appl. No.: 16/894,927

(22) Filed: Jun. 8, 2020

(65) Prior Publication Data
US 2020/0392700 A1 Dec. 17, 2020

(30) Foreign Application Priority Data

Jun. 17, 2019 (EP) .................................. 19305770

(51) Int. Cl.
| | | |
|---|---|---|
| B60K 37/06 | (2006.01) | |
| E02F 9/20 | (2006.01) | |
| B60K 35/00 | (2006.01) | |

(52) U.S. Cl.
CPC ............ *E02F 9/2004* (2013.01); *B60K 35/00* (2013.01); *B60K 37/06* (2013.01); *B60K 2370/122* (2019.05); *B60K 2370/1438* (2019.05); *B60K 2370/61* (2019.05)

(58) Field of Classification Search
CPC . B60K 37/06; B60K 2370/12; B60K 2370/61
See application file for complete search history.

(56) References Cited

U.S. PATENT DOCUMENTS

| | | | |
|---|---|---|---|
| 2016/0078681 A1* | 3/2016 | Shikoda | G06T 7/73 345/633 |
| 2017/0240175 A1* | 8/2017 | Miwa | F16H 59/04 |
| 2018/0107236 A1 | 4/2018 | Weigand | |
| 2018/0142446 A1 | 5/2018 | Silber | |
| 2019/0150352 A1* | 5/2019 | Salzman | A01B 69/007 |

FOREIGN PATENT DOCUMENTS

| | | |
|---|---|---|
| DE | 102014104283 A1 | 10/2015 |
| DE | 102017110045 A1 | 11/2018 |

OTHER PUBLICATIONS

XP055489300 Anonymous: "Fendt 720, 722, 724 Vario" Fendt 700 Series Operator's Manual, Jun. 1, 2011 p. 195-p. 196.
English language abstract of DE 102017110045.
English language abstract of DE 102014104283.

* cited by examiner

*Primary Examiner* — Andrea C Leggett
(74) *Attorney, Agent, or Firm* — Brian Gordaychik

(57) ABSTRACT

A work vehicle, including: a plurality of control valves configured to selectively convey hydraulic fluid to a hydraulic machine, a plurality of controllers connected to said control valves, a terminal including a display screen displaying graphics associated with said valves, a setting button configured to selectively modify a connection between the control valves and the controllers, and modify graphics based on changes of the connection.

20 Claims, 5 Drawing Sheets

[Fig. 1]
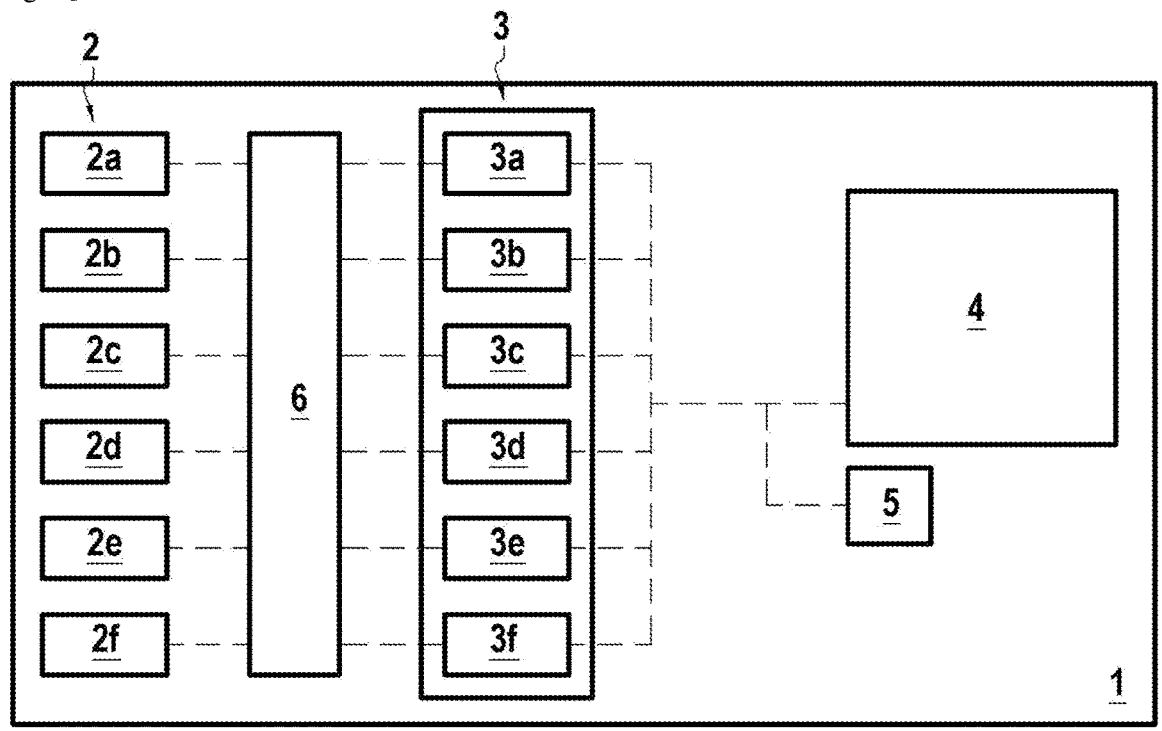
[Fig. 2]
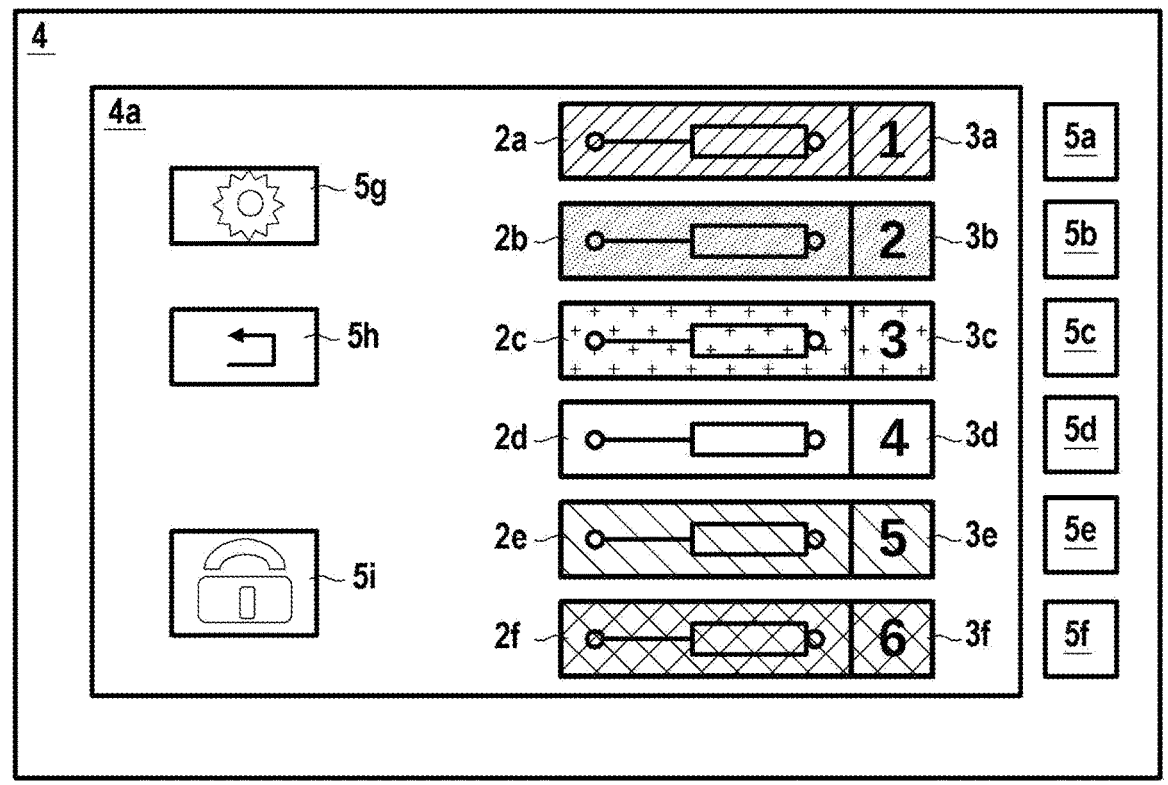

[Fig. 3]
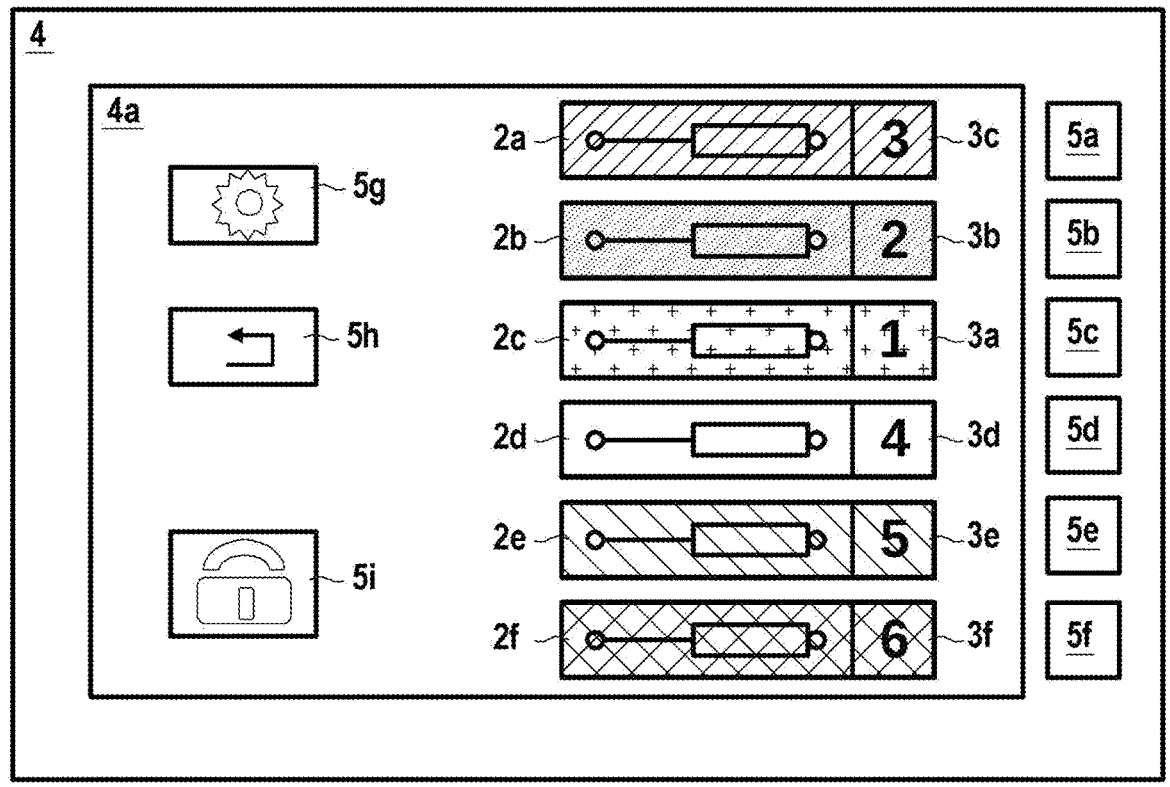
[Fig. 4]
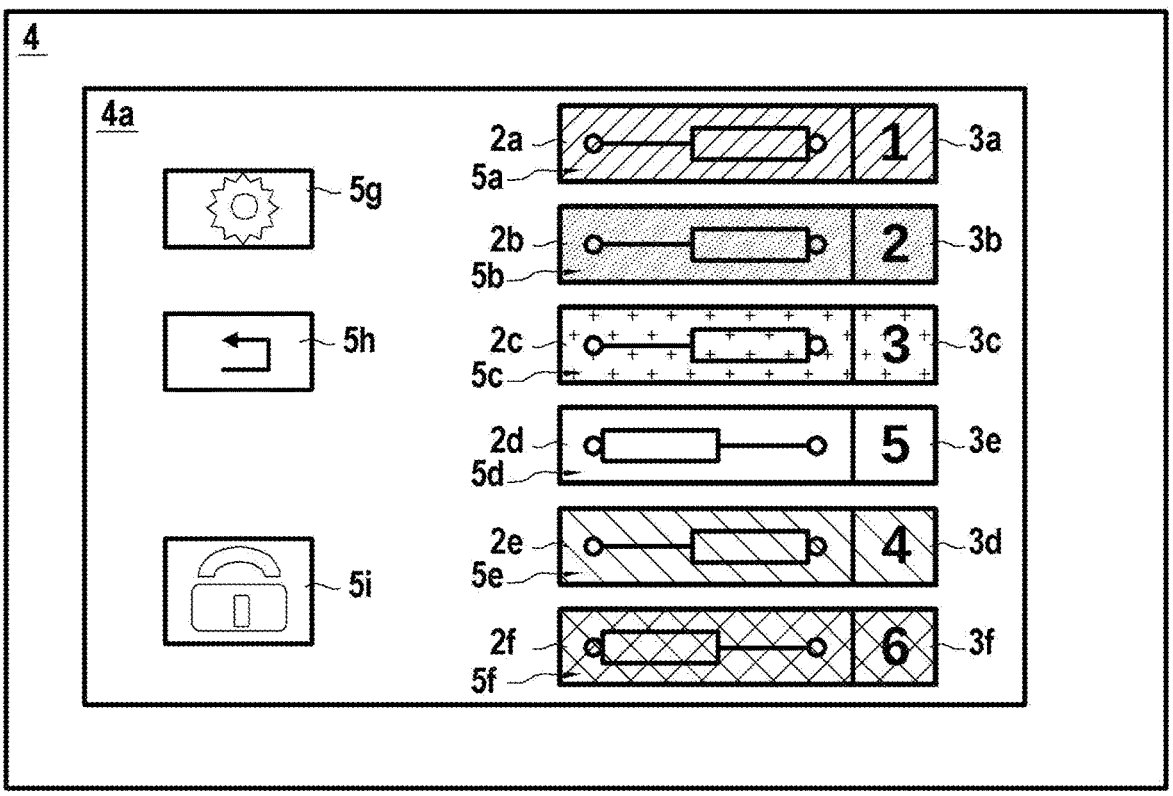

[Fig. 7]
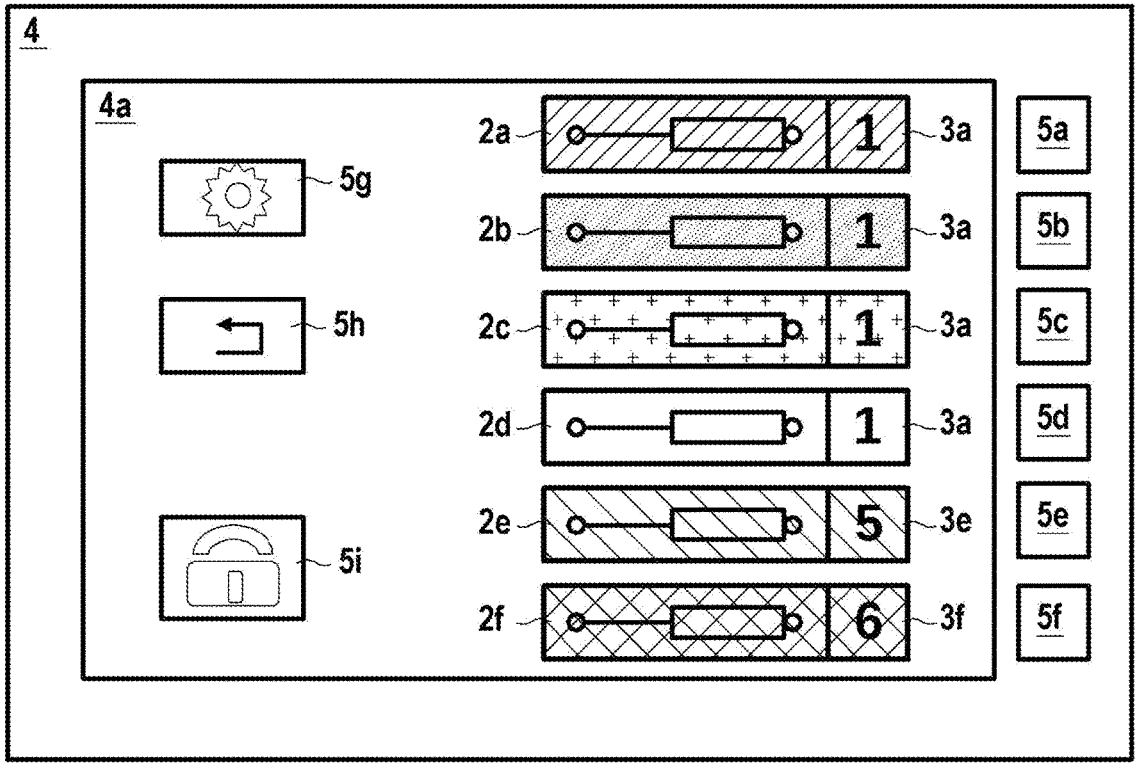
[Fig. 8]
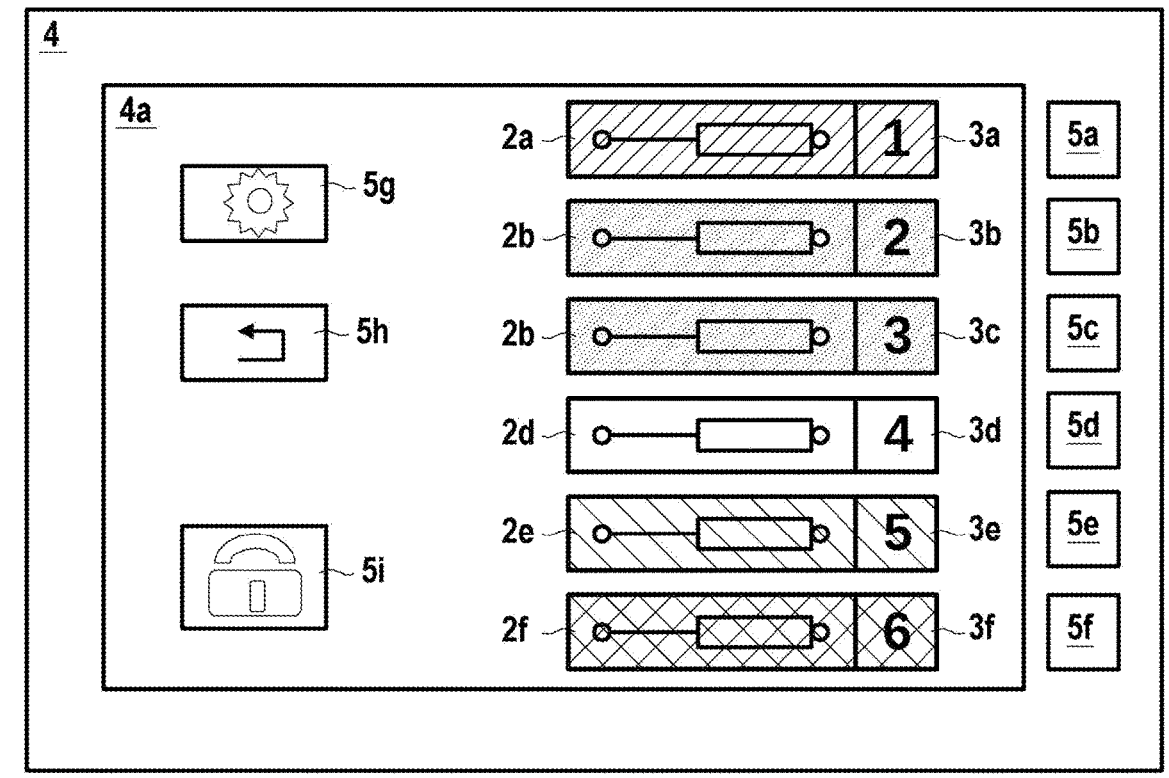

[Fig. 9]
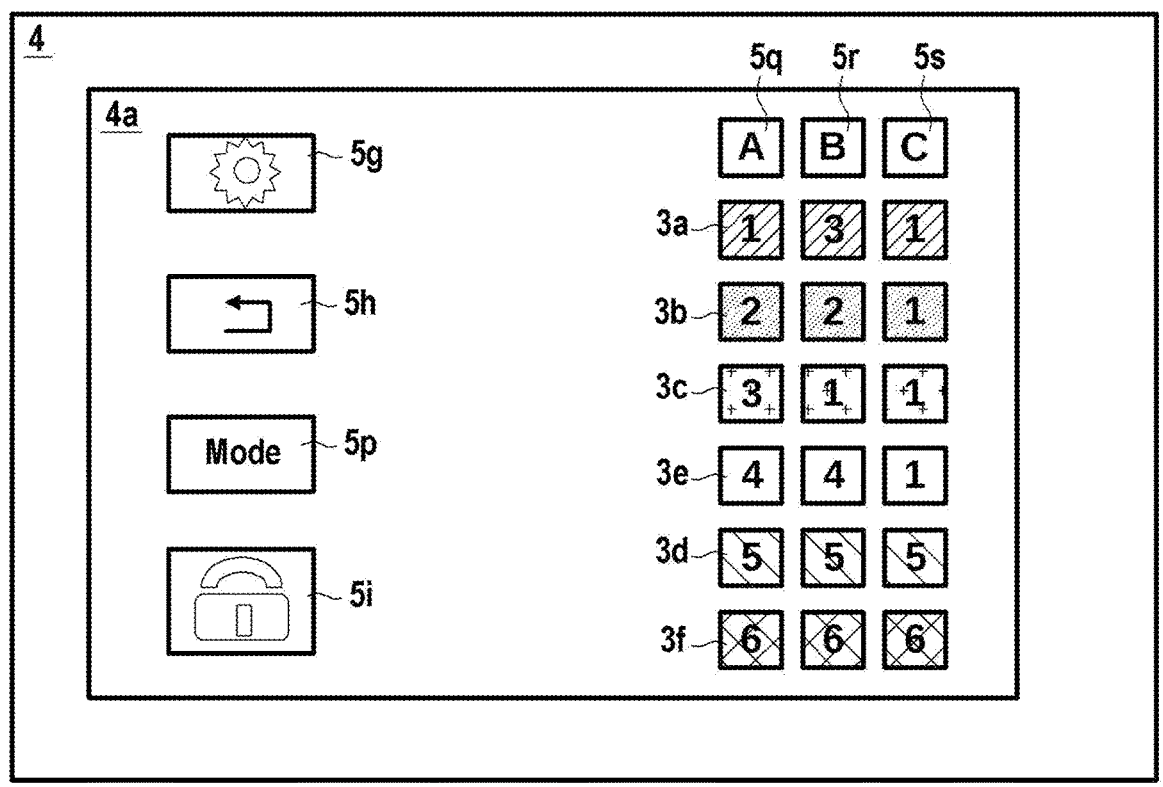

ially modify the connection between two control valves and two controllers. -->

WORK VEHICLE WITH IMPROVED CONTROL VALVES CONTROLLERS

TECHNICAL FIELD

The present disclosure relates to the field of work vehicles, and more specifically to a terminal to control the various valves of a work vehicle.

BACKGROUND ART

Work vehicles like tractors comprise a number of auxiliary valves, which are usually electro-hydraulic or mechanical valves. These valves are used to control various auxiliary devices of the work vehicle such as trailers or implements to which they are coupled.

The control of these multiple valves is usually achieved through a terminal, but it raises a number of difficulties for the users due to the recent changes in the implements, the fact that different users can use a same work vehicle, and also the fact that such a terminal usually presents different types of controls such as buttons and a joystick, and that some users would rather use a specific type of control to command a given implement or valve.

The present disclosure therefore aims at improving these aspects of a work vehicle.

PRESENTATION OF THE INVENTION

The present disclosure is related to a work vehicle, including:
- a plurality of control valves configured to selectively convey hydraulic fluid to a hydraulic apparatus,
- a plurality of user-operated controllers connected to said control valves, the controllers being user-manipulated controllers to command the control valve,
- a terminal including a display screen displaying graphics associated with said valves,
- a setting button configured to selectively modify a connection between the control valves and the controllers, and modify the graphics based on changes of the connection.

In an example embodiment, the setting button is configured to selectively modify the connection between two control valves and two controllers.

In an example embodiment, the setting button is configured to selectively invert a flow direction of the hydraulic fluid of a selected control valve.

In an example embodiment, the setting button is configured to selectively modify the connection between the control valves and the controllers so as to connect two or more of the control valves to the same controller.

In an example embodiment, the setting button is configured to selectively modify the connection between the control valves and the controllers so as to connect two or more of the controllers to the same control valve.

In an example embodiment, the terminal is configured to display a plurality of combinations of connections of the controllers and the control valves.

The terminal can then be configured to display a visual signal if a configuration has been modified from a predetermined configuration to a personalized configuration.

In an example embodiment, the terminal includes a storage memory, and is configured to store information related to the predetermined configuration and to one or more personalized configurations into said storage memory.

The terminal can then be configured to enable a user to select one of the stored predetermined configuration or of the personalized configurations, and to associate the control buttons and the control valves according to the selected predetermined configuration or personalized configuration.

The terminal can be configured to display information relating to the currently selected configuration.

In an example embodiment, the setting button is a graphics on the display screen.

In an example embodiment, the setting button includes a lock button configured to prevent modifications of the connection between the control valves and the controllers.

BRIEF PRESENTATION OF THE DRAWINGS

Other features, aims and advantages of the invention will be detailed in the following description, which is purely illustrative and should not be interpreted in a limiting way, and which should be read in view of the enclosed drawings, wherein:

FIG. 1 is a schematic representation of a work vehicle according to an aspect of the present disclosure.

FIG. 2 represents an example of display by a terminal of the work vehicle.

FIGS. 3, 4, 7, 8 and 9 illustrate examples of modifications of the display by the terminal of the work vehicle.

Figure 5A:
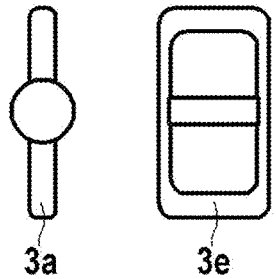

FIGS. 5a-c and 6a-b illustrate examples of controllers for a work vehicle according to an aspect of the disclosure.

In the various drawings, elements in common are designated by identical numeral references.

DETAILED DESCRIPTION

FIG. 1 is a schematic representation of a work vehicle according to an aspect of the present disclosure.

This figure represents a work vehicle 1 which comprises a plurality of control valves 2, a plurality of controllers 3 connected to the control valves 2, a terminal 4 and a setting button 5.

The control valves 2 are for instance hydraulic valves that are configured to selectively convey hydraulic fluid to a hydraulic apparatus, such as a hydraulic pump, a hydraulic engine, a cylinder, or more generally an apparatus that is operated by hydraulic fluid. The control valves 2 can supply various auxiliary devices of the work vehicle 1 such as trailers or implements to which they are coupled.

In the illustrated embodiment, the work vehicle 1 comprises 6 control valves 2a, 2b, 2c, 2d, 2e and 2f, and 6 controllers 3a, 3b, 3c, 3d, 3e, 3f. It is clear that the present disclosure is not limited to a work vehicle with a specific number of control valves 2 and controller 3, and that the present disclosure relates to a work vehicle with a plurality of control valves 2 and controllers 3, or any number higher than 2 of control valves 2 and controllers 3. The work vehicle 1 typically comprises at least as many controllers 3 as control valves 2, for instance as many controllers 3 as control valves 2.

The controllers 3 are typically control buttons, levers, joysticks or any type of controller than a user can manipulate to command a control valve 2. The controllers 3 are for instance arranged on a console in a cabin of the work vehicle 1.

The control valves 2 are for instance single-directional control valves or bi-directional control valves.

The terminal 4 can comprise a display screen 4a of any equipment adapted to display information to the user (see FIG. 2).

The setting button 5 can be distinct from the terminal 4, or can be integrated in the terminal 4. For instance if the terminal 4 comprises a touch screen display, then the setting button 5 can be a graphic on the touch screen display. The setting button 5 can for instance be integrated to a console of the work vehicle 1.

The control valves 2 and the controllers 3 are connected to each other, so that a user of the work vehicle 1 can control operation of the control valves 2 by operating the controllers 3. For instance, a user can control the displacement of a control valve 2 by pressing on an associated controller 3 such as a button, or by manipulating a joystick.

In a conventional configuration, each of the control valves 2 is associated with a controller 3 through a valve controller 6, so the user can operate independently each of the control valves 2. This is the configuration that is represented in FIG. 1. In this configuration, control valve 2a is associated with controller 3a,
control valve 2b is associated with controller 3b,
control valve 2c is associated with controller 3c,
control valve 2d is associated with controller 3d,
control valve 2e is associated with controller 3e, and
control valve 2f is associated with controller 3f.

The valve controller 6 may be a solenoid valve controller which is able to change relationships between inputs and outputs of valves 2 by a control signal. For instance, the valve controller 6 changes the connection from control valve 2a and the controller 3a to control valve 2a and the controller 3b by a control signal.

The terminal 4 displays graphics which illustrate the current association of the control valves 2 and controllers 3.

FIG. 2 illustrates an example of the terminal 4.

The terminal 4 displays a representation of the control valves 2 on a screen 4a, which can for instance be differentiated by using colours, labels, or any adapted visual representation, and also displays the associated controller 3 on the screen 4a, which is here indicated by a number. Any type of representation can be used to indicate the controller 3, a letter, a number, a label or any type of visual representation. In the embodiment disclosed in FIG. 2, the control valves 2 are identified by different patterns on the background of the representation of each control valve 2, which can for instance also be colours.

The controllers 3 are typically identified using sequential signs, such as letters or numbers that are arranged in succession. In the illustrated embodiment, the controllers 3 are designated by numbers 1 to 6 which are arranged in growing succession from 1 to 6.

The terminal 4 enables the user to easily identify which controller 3 is assigned to which control valve 2. For instance the terminal as illustrated represents six associations of a control valve 2 and a controller 3. The user can therefore directly see that the control valve 2a is associated with the controller 3a (designated by the graphic number 1), the control valve 2b is associated with the controller 3b (designated by the graphic number 2), the control valve 2c is associated with the controller 3c (designated by the graphic number3), the control valve 2d is associated with the controller 3d (designated by the graphic number 4), the control valve 2e is associated with the controller 3e (designated by the graphic number 5) and the control valve 2f is associated with the controller 3f (designated by the graphic number 6).

The setting button 5 of the terminal 4 is configured to enable the user to selectively modify the associations of the control valves 2 and the controllers 3. In the illustrated embodiment the terminal 4 comprises hardware buttons 5a, 5b, 5c, 5d, 5e and 5f for setting valves 2 and the controllers 3, and also comprises graphic buttons 5g, 5h and 5i on the screen which is a touch screen. In the illustrated embodiment, buttons 5a to 5f are hardware buttons, but it is understood that graphic buttons can also be provided, for instance, graphics used to depict for control valves 2 and controllers 3 could be used with touch screen to define graphic buttons.

In a first example, the setting button 5 is configured to enable the user to selectively modify the connection between two control valves 2 and two controllers 3. Their respective associations can therefore be switched or inverted.

If a user considers for instance the associations mentioned previously in reference to FIG. 2, then the setting button 5 can be used for instance in order to swap the connections between the blue control valve and the green control valve and their respective controllers 3a and 3c. First, a user touches the button 5g on the screen 4a and gets a setting mode of the valves 2. The user then pushes the button 5a and 5c and then touches the button 5h on the screen 4a to close the setting mode of the valves 2. Display screen 4a can then display some visual signals like flash, animations, to indicate to the user that a change in the configuration has been saved.

The terminal 4 will then modify the graphics displayed so as to indicate the changes of the connections between the control valves 2 and the controllers 3, as illustrated in FIG. 3.

In this example, the terminal 4 does not change the order of the control valves 2, but modifies the designation of their associated controllers 3. We can see in FIG. 3 that the visual display of the order of the controllers 3 has changed from 1-2-3-4-5-6 to 3-2-1-4-5-6, which means that the control valve 2a is now associated with controller 3c and the control valve 2c is now associated with controller 3a.

Such a visual change of a suite of subsequent elements is easy and convenient for the user to distinguish, and a user can easily identify that the configuration of the work vehicle 1 has been changed from a standard or initial configuration to a custom or personalized configuration.

As an alternative, the order of the controllers 3 remain the same, but the order of the control valves 2 is modified, for instance by modifying the order of the colours (that are here symbolized by different backgrounds for the control valves 2) that are displayed on the display screen 4a of the terminal 4.

The setting button 5 can then be used to either revert the associations of the control valves 2 and the controller 3 to the previous configuration, or to further modify the associations of the control valves 2 and the controller 3 by inverting other connections between two control valves 2 and two controllers 3. If a user wishes not to allow the modification by other users, the user can for instance touch the button 5i on the screen 4a in FIG. 2 (in this example, button 5i is a lock button) to activate a locked mode of the valves 2 that prevents modifications of the configuration.

Enabling a user to invert the associations of the control valves 2 and the controller 3 allows the user to arrange a specific configuration of the commands that suits the user best, and can therefore improve the use of the work vehicle 1 for the user. This also enables the user to correct a mistake when coupling the implements of the work vehicle; the user can simply modify the associations between the controllers 3 and the control valves 2 instead of having to unplug and couple again the implements to the control valves 2.

In a second example which is now described in relation to FIG. 4, the setting button 5 is configured to enable a user to selectively invert a flow direction of a fluid of the selected valve. The fluid can be a hydraulic fluid or a pneumatic fluid.

In this embodiment, buttons 5a to 5f described previously are graphic buttons defined on the touch screen 4a.

Each of the control valves 2 is configured to control the circulation of a fluid in a circuit including the valve controller 6.

In this example, the work vehicle 1 has two different flow directions, a normal flow direction and an inverted flow direction, which are controlled by a bi-directional control valve 2. A flow direction is initially set with a normal flow direction for all control valves 2. If a user wishes to invert a flow direction of a fluid of the selected valve, the user touches the button 5g on the display screen 4a represented in FIG. 4 to initiate a configuration mode. The user then touches button 5d on the display screen 4a and button 5f on the display screen 4a to select the valves whose configuration is to be modified. The user finally touches button 5h on the display screen 4a to end the configuration mode. The representation of valves 2d and 2f on the display screen 4a are then changed with inverted direction as shown in FIG. 4 to provide a visual indication to the user that the configuration of these two valves has been modified, and more specifically that the flow direction of valve 2d which is associated with the controller 3e and the flow direction of valve 2f which is associated with the controller 3f are inverted.

Figure 5B:
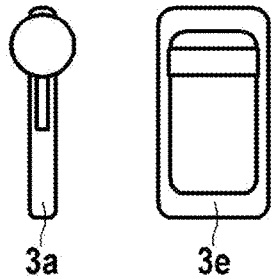
Figure 5C:
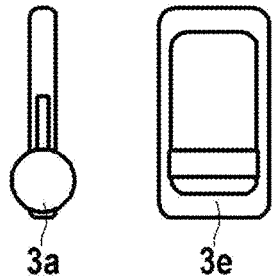

As an example, the controllers 3 are three-position controllers, the controller 3a is a lever and the controller 3e is a switch. FIGS. 5a to 5c illustrate an initial configuration where:
  in a middle or neutral position, the controller 3 sets the flow of fluid to 0 (FIG. 5a);
  in a raised position, the controller 3 sets the flow of fluid to Fmax with a normal flow (FIG. 5b), and
  in a lowered position, the controller 3 sets the flow of fluid to −Fmax with an inverted flow (FIG. 5c), which corresponds to a flow of fluid with a same flow value but in a reverse direction when compared to the flow with the normal flow.

As mentioned, a user can operate the setting button 5 to invert this configuration, so that:
  in the middle or neutral position, the controller sets the flow of fluid to 0 (FIG. 5a);
  in the raised position which sets the flow of fluid to −Fmax with an inverted flow (FIG. 5b), and
  in the lowered position which sets the flow of fluid to Fmax with a normal flow (FIG. 5c).

Specifically, if we consider the valve associations as represented in FIG. 4, then once the configuration has been inverted, the valve 2a which is controlled by the controller 3a is a normal flow direction and the valve 2d which is controlled by the controller 3e is an inverted flow direction.

The controllers 3 can be five-position controllers. The controllers present the three positions mentioned previously, and also two blocked positions which are respectively after the raised position and after the lowered position, where the controller 3 is then blocked (or stable) in the raised or lowered position.

More specifically the controller 3 can then present:
  a middle or neutral position, in which the controller 3 is stable and sets the flow of fluid to 0 (FIG. 5a).
  a raised position, in which the controller 3 sets the flow of fluid to Fmax with a normal flow (FIG. 5b) and where said controller 3 is not blocked in position (i.e. this is not a stable position, and the controller 3 then tends to revert back to the middle or neutral position).
  a blocked raised position, in which the controller 3 sets the flow of fluid to Fmax with a normal flow (FIG. 5b). This position is for instance achieved by pushing the controller 3 beyond a stop or beyond a threshold when in the raised position, to reach a stable position where the controller 3 will remain in position.
  a lowered position, in which the controller 3 sets the flow of fluid to −Fmax with an inverted flow (FIG. 5c), which corresponds to a flow of fluid with a same flow value but in a reverse direction when compared to the flow with the normal flow.
  a blocked lowered position, in which the controller 3 sets the flow of fluid to −Fmax with an inverted flow (FIG. 5c). This position is for instance achieved by pushing the controller 3 beyond a stop or beyond a threshold when in the lowered position, to reach a stable position where the controller 3 will remain in position.

The setting button 5 can then be operated in order to invert this configuration, in the same way as for the three-position controller mentioned previously.

Figure 6A:
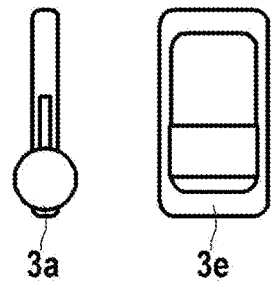
Figure 6B:
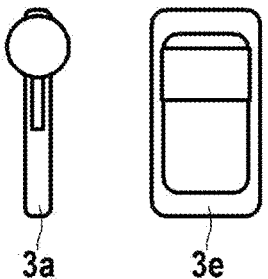

As another example, the controllers 3 are two-position controllers, and the controller 3a is a lever and the controller 3e is a switch. FIGS. 6a to 6b illustrate an initial configuration initial configuration where:
  in a lowered position, the controllers 3 set the flow of fluid to 0 (FIG. 6a), and
  in a raised position, the controllers 3 set the flow of fluid to Fmax with a normal flow (FIG. 6b).

As for the previous example, a user can operate the setting button 5 to invert this configuration, so that:
  in a lowered position, the controller sets the flow of fluid to 0 (FIG. 6a), and
  in a raised position which sets the flow of fluid to −Fmax with an inverted flow (FIG. 6b).

Specifically, if we consider the valve associations as represented in FIG. 4, then once the configuration has been inverted, then in FIG. 6b, the controllers 3a and 3e are in a raised position, the flow direction of the valve 2a is a normal flow direction and the flow direction of the valve 2d is an inverted flow direction.

Such an inversion of the direction of the fluid is useful for instance in a case where a user made a mistake when coupling the implements to the control valves 2 of the work vehicle 1, in that it enables a user to correct this mistake without having to get down from the work vehicle and having to un-couple and then couple again the implements (not needs to reconnection of cables).

It is to be understood that while the present examples were described in relation to a lever and a switch, it is clear that this function also applies to different types of controllers 3 such as buttons, actuators, joysticks or touch screen controls.

Any type of visual indication can be used to provide a clear visual indication to the user that the direction of the flow of fluid has been inverted, such as inverting the graphical representation of the control valve 2 and/or inverting + and − signs on the display for the appropriate valves.

In the example of display by the terminal 4 represented in FIG. 4, the association between the control valve 2d and the control valve 2e with their respective controllers have also been modified, as detailed previously. This is to illustrate that as one can understand, the different described functions of the setting button 5 can be combined in a same work vehicle 1.

In a third example, the setting button 5 is configured to modify the connections between the control valves 2 and the controllers 3 so as to assign multiple control valves 2 to a single controller 3.

If a user considers for instance an initial configuration of the control valves 2 and controllers 3 as already described in reference to FIG. 2, then the user can operate the setting button 5 for instance to assign two to six of the control valves 2 to the same controller 3.

FIG. 7 presents an example of display by the terminal 4 after actuating the setting button as per the third example.

In this example, starting from the initial configuration as already described in reference to FIG. 2, the setting button has been operated to assign four control valves (in the present case control valves 2a, 2b, 2c and 2d) to a single controller (in the present case controller 3a designated as controller number 1 on the display screen 4a of the terminal 4).

In this modified configuration, the controller 3a then simultaneously commands the control valves 2a, 2b, 2c and 2d. Controller 3e commands control valve 2e, and controller 3f commands control valve 2f. Controllers 3b, 3c and 3d do not command any of the control valves 2.

This example of function of the setting button 5 is advantageous for instance in cases where multiple control valves 2 have to be operated simultaneously. Enabling a user to control them simultaneously with a single controller 3 thereby significantly simplifies such operations, rather than having to manually operate multiple controllers 3 at the same time, which would lead to risks of either damaging the equipment associated to the control valves, or reducing the quality of the operations made.

As for the previous examples, it is to be understood that the example illustrated in FIG. 7 does not limit the scope of the present disclosure. This operation of the setting button 5 can be achieved multiple times, for instance to define different groups that each comprise one or more than one control valve 2, each of these groups being assigned to a different controller 3.

Also, this function of the setting button 5 can be combined with the other functions of the setting button 5 described previously.

In a fourth example, the setting button 5 is configured to modify the connections between the control valves 2 and the controllers 3 so as to assign multiple controllers to a single control valve 2.

If a user considers for instance an initial configuration of the control valves 2 and controllers 3 as already described in reference to FIG. 2, then the user can operate the setting button 5 for instance to assign two to six of the controllers 3 to the same control valve 2.

FIG. 8 presents an example of display by the terminal 4 after actuating the setting button as per the third example.

In this example, starting from the initial configuration as already described in reference to FIG. 2, the setting button has been operated to assign two controllers (in the present case controllers 3b and 3c) to a single control valve 2 (in the present case control valve 2b). In FIG. 8, the background associated to controllers 3b and 3c are identical. The background can for instance symbolize a colour displayed on the display screen 4a of the terminal 4, for instance to indicate to the user that the red control valve is associated to the controllers 3b and 3c.

In this modified configuration, both controllers 3b and 3c control the control valve 2b. The user can therefore use either of controllers 3b and 3c to control the control valve 2b. In this example, we can see that control valve 2c is not associated to any one of the controllers 3; it can not be operated.

This example of function of the setting button 5 is advantageous for instance in order to limit the number of control valves 2 that should be operated by the user, or to simplify the operation of the work vehicle when a limited number of control valves 2 are to be operated.

As for the previous examples, it is to be understood that the example illustrated in FIG. 7 does not limit the scope of the present disclosure. This operation of the setting button 5 can be achieved multiple times, for instance to define different groups that each comprise one or more than one controller 3, each of these groups being assigned to a different control valve 2.

Also, this function of the setting button 5 can be combined with the other functions of the setting button 5 described previously.

The various functions of the setting button 5 described previously therefore enable a user to personalize the association of the control valves 2 and the controllers 3 in the work vehicle 1, so as to define a configuration which is suitable either for operator's personal preferences or for a specific configuration of the work vehicle 1, for instance depending on the implements that are associated to the work vehicle 1.

In the different examples and functions of the setting button 5 as described previously, the terminal 4 is configured to modify graphics on the display screen 4a and shows current conditions (modified conditions) were made to the connections between the control valves 2 and the controllers 3. This enables a user to check the current configuration of the work vehicle, and is also useful in the case where multiple users use the same work vehicle 1, in that it enables users to immediately identify changes in the configuration that were made by previous user of the work vehicle 1.

The setting button 5 can also be configured to as to enable users of the work vehicle 1 to define and store personalized configurations or pre-set configurations of the associations of the control valves 2 and controllers 3 as represented for instance in FIG. 9.

The work vehicle 1 can then comprise means for storing data such as a non-volatile memory to store information relating to the personalized configurations defined by users of the work vehicle 1. The non-volatile memory can be an element of the terminal 4 or a distinct element.

A user can then operate the setting button 5 for instance to perform the following operations. First, a user double-clicks the button 5g on the screen 4a to initiate a configuration mode, and gets a mode selection button 5p on the screen 4a which indicated to the user that the terminal 4 is now in a configuration selection mode. A user then chooses and pushes one of buttons 5q, 5r or 5s to as to select a configuration selection of valves 2 and their associated controllers 3. A user then touches the button 5h on the screen 4a to end the setting selection. For instance, if a user pushes the button 5r (mode B), the valves 2 are set to 3-2-1-4-5-6.

A user can also store the current configuration of the associations of the control valves 2 and controllers 3. The user can for instance define a label or a name to this personalized configuration instead of currently display A-B-C, in order to be able to load it in ulterior uses of the work vehicle 1 without having to manually define all the associations between the control valves 2 and controllers 3.

A user can select a stored configuration and load it, so the connections between the control valves 2 and controllers 3 are arranged as defined by this stored configuration. The terminal 4 for instance display the different configurations that are stored within a memory of the work vehicle 1, so a user can select one of these stored configurations.

A user can restore the initial configuration (pre-set) of the connections between the control valves 2 and controllers 3 of the work vehicle 1, for instance a factory (or standard) configuration of the connections between the control valves 2 and controllers 3 of the work vehicle 1.

The terminal 4 can be configured so as to display a visual indication when the current configuration of the connections between the control valves 2 and the controllers 3 corresponds to a stored configuration, for instance by displaying a label or name of the corresponding stores configuration. A user of the work vehicle can therefore easily confirm whether the current configuration of the work vehicle is the desired configuration or not. For instance, if the current configuration of the work vehicle corresponds to a stored configuration which was labelled "User X" by the user, the terminal 4 can display "User X" on its screen.

In the various operations of the setting button 5, the user inputs commands through the setting button 5 which are then processed by a unit such as a vehicle control unit (commonly designated under the acronym "VCU") which manage the modifications in the connections between the control valves 2 and the controllers 3 requested by a user. The terminal then updates the graphics displayed to display the current configuration of the work vehicle, which provides indications to a user as to the modifications that were made in the connections.

The work vehicle 1 as described therefore provides an improved user experience by enabling the user to personalize the connections between the control valves 2 and the controllers 3. Such features have not been available to work vehicles 1, and this provides significant improvements for users.

The invention claimed is:

1. A work vehicle, comprising:
    a plurality of control valves configured to selectively convey hydraulic fluid to a hydraulic machine,
    a plurality of user-operated controllers connected to said control valves configured so that operating a controller commands one or more control valves associated to said controller,
    a terminal comprising a display screen displaying graphics associated with said valves, and
    a setting button configured to selectively modify a connection between the control valves and the controllers, and modify the graphics based on changes of the connection,
    wherein the setting button is configured to selectively modify the connection between the control valves and the controllers so as to switch between a first configuration in which each control valve is associated individually with a distinct controller, a second configuration in which two or more of the control valves are associated to the same controller or a third configuration in which two or more of the controllers are associated to the same control valve.

2. The work vehicle according to claim 1, wherein the setting button is configured to selectively modify the connection between two control valves and two controllers.

3. The work vehicle according to claim 1, wherein the setting button is configured to selectively invert a flow direction of the hydraulic fluid of a selected control valve.

4. The work vehicle according to claim 1, wherein the terminal is configured to display a plurality of combinations of connections of the controllers and the control valves.

5. The work vehicle according to claim 4, wherein the terminal is configured to display a visual signal if a configuration of the connection between the control valves and the controllers has been modified from a predetermined configuration to a personalized configuration.

6. The work vehicle according to claim 5, wherein the terminal comprises a storage memory, and is configured to store information related to the predetermined configuration and to one or more personalized configurations into said storage memory.

7. The work vehicle according to claim 6, wherein the terminal is configured to enable a user to select one of the stored predetermined configuration or of the personalized configurations as a selected configuration, and to associate the controllers and the control valves according to the selected configuration.

8. The work vehicle according to claim 7, wherein the terminal is configured to display information relating to the selected configuration when the selected configuration is selected.

9. The work vehicle according to claim 1, wherein the graphics on the display screen includes the setting button.

10. The work vehicle according to claim 1, wherein the setting button includes a lock button configured to prevent modifications of the connection between the control valves and the controllers.

11. The work vehicle according to claim 1, wherein the setting button is configured to selectively modify the connection between the control valves and the controllers so as to switch between the first configuration, the second configuration and the third configuration.

12. A work vehicle, comprising:
    a plurality of control valves configured to selectively convey hydraulic fluid to a hydraulic machine,
    a plurality of user-operated controllers connected to said control valves, configured so that operating a controller commands one or more control valves associated to said controller,
    a terminal comprising a display screen displaying graphics associated with said valves, and
    a setting button configured to selectively modify a connection between the control valves and the controllers, and modify the graphics based on changes of the connection,
    wherein the setting button is configured to selectively modify the connection between the control valves and the controllers so as to switch between a first configuration in which each control valve is associated individually with a distinct controller, a second configuration in which two or more of the control valves are associated to the same controller or a third configuration in which two or more of the controllers are associated to the same control valve.

13. The work vehicle according to claim 12, wherein the terminal is configured to display a plurality of combinations of connections of the controllers and the control valves.

14. The work vehicle according to claim 13, wherein the terminal is configured to display a visual signal if a configuration of the connection between the control valves and the controllers has been modified from a predetermined configuration to a personalized configuration.

15. The work vehicle according to claim 14, wherein the terminal comprises a storage memory, and is configured to store information related to the predetermined configuration and to one or more personalized configurations into said storage memory.

16. The work vehicle according to claim 15, wherein the terminal is configured to enable a user to select one of the stored predetermined configuration or of the personalized configurations as a selected configuration, and to associate the controllers and the control valves according to the selected configuration.

17. The work vehicle according to claim 16, wherein the terminal is configured to display information relating to the selected configuration when the selected configuration is selected.

18. The work vehicle according to claim 12, wherein the graphics on the display screen includes the setting button.

19. The work vehicle according to claim 12, wherein the setting button includes a lock button configured to prevent modifications of the connection between the control valves and the controllers.

20. The work vehicle according to claim 12, wherein the setting button is configured to selectively modify the connection between the control valves and the controllers so as to switch between the first configuration, the second configuration and the third configuration.

* * * * *